US012803611B2

(12) United States Patent
Brandt

(10) Patent No.: US 12,803,611 B2
(45) Date of Patent: Nov. 17, 2026

(54) RECONFIGURABLE MOBILE DEVICE CASE

(71) Applicant: Havis, Inc., Warminster, PA (US)

(72) Inventor: Jamie W. Brandt, Faribault, MN (US)

(73) Assignee: Havis, Inc., Warminster, PA (US)

( * ) Notice: Subject to any disclaimer, the term of this patent is extended or adjusted under 35 U.S.C. 154(b) by 314 days.

(21) Appl. No.: 18/393,854

(22) Filed: Dec. 22, 2023

(65) Prior Publication Data

US 2025/0211277 A1 Jun. 26, 2025

(51) Int. Cl.
*H04B 1/3888* (2015.01)

(52) U.S. Cl.
CPC .................................. *H04B 1/3888* (2013.01)

(58) Field of Classification Search
CPC .......... H04B 1/3888; G06F 2200/1633; A45C 11/003
See application file for complete search history.

(56) References Cited

U.S. PATENT DOCUMENTS

| | | | | |
|---|---|---|---|---|
| 5,711,013 | A | 1/1998 | Collett et al. | |
| 5,729,478 | A | 3/1998 | Ma et al. | |
| 5,818,691 | A | 10/1998 | McMahan et al. | |
| 6,711,012 | B1 | 3/2004 | Medin et al. | |
| 7,230,833 | B1 | 6/2007 | Sickels | |
| 7,708,240 | B2 * | 5/2010 | Homer | G06F 1/1601 248/920 |
| 7,778,023 | B1 | 8/2010 | Mohoney | |
| 8,047,365 | B1 | 11/2011 | Lin et al. | |
| 8,610,398 | B2 | 12/2013 | Lee et al. | |
| 8,863,793 | B2 * | 10/2014 | Black | A45C 1/06 150/147 |

(Continued)

FOREIGN PATENT DOCUMENTS

| | | |
|---|---|---|
| WO | 2009/147889 A1 | 12/2009 |
| WO | 2013/166326 A1 | 11/2013 |
| WO | 2015/077613 A1 | 5/2015 |

OTHER PUBLICATIONS

Gear Diary Staff, "Justin Case Rechargeable IPad Battery Case Review", (Aug. 3, 2013), https://geardiary.com/2013/08/03/justin-case-rechargeable-ipad-battery-case-review/, (9 pages).

(Continued)

*Primary Examiner* — Jinsong Hu
*Assistant Examiner* — Rui M Hu
(74) *Attorney, Agent, or Firm* — Buchanan Ingersoll & Rooney PC

(57) ABSTRACT

Mobile device cases, mobile device stands, and methods and uses therefor are disclosed. One mobile device case includes a rear cover and a front cover. The rear cover is configured to cover at least a portion of a rear surface of the mobile device. The rear cover includes a plurality of first arms. The front cover is configured to cover at least a portion of a front surface of the mobile device. The front cover includes a plurality of second arms configured to engage with the plurality of first arms to attach the front cover to the rear cover. The rear cover and front cover are configured to accommodate the mobile device therebetween and to prevent removal of the mobile device when the plurality of second arms engage with the plurality of first arms. The plurality of second arms engage with the plurality of first arms via a sliding engagement.

17 Claims, 9 Drawing Sheets

(56) References Cited

U.S. PATENT DOCUMENTS 8,873,233 B2 10/2014 Reber et al.
8,913,376 B2 * 12/2014 Wu ........................ G06F 1/1669 361/679.08
8,935,438 B1 1/2015 Ivanchenko
8,974,126 B2 3/2015 Sloey et al.
9,143,181 B1 * 9/2015 Jia ........................ H04B 1/3888
9,195,279 B2 11/2015 Carnevali et al.
9,204,568 B2 12/2015 Lerenthal
9,231,410 B2 * 1/2016 Wojcik .................. G06F 1/1632
9,241,064 B2 1/2016 Slaby et al.
9,567,776 B2 2/2017 Moock et al.
9,602,639 B2 3/2017 Carnevali
9,608,366 B2 3/2017 Vroom et al.
9,632,535 B2 4/2017 Carnevali et al.
9,678,537 B2 6/2017 Kupferstein
9,706,026 B2 7/2017 Carnevali
9,735,400 B2 * 8/2017 Watanabe ........... H04M 1/0262
9,831,905 B1 * 11/2017 Flores .................. H04B 1/3888
9,843,657 B1 * 12/2017 Guzek ................. H04M 1/0202
10,229,303 B2 3/2019 Gerst, III et al.
10,536,181 B2 * 1/2020 Bergreen .............. H04M 1/185
10,778,275 B2 9/2020 Carnevali
11,165,458 B2 11/2021 Carnevali
12,313,213 B2 * 5/2025 Serna ..................... A45C 11/00
2003/0232530 A1 12/2003 Vista, Jr. et al.
2004/0057199 A1 3/2004 Azuchi
2005/0168937 A1 8/2005 Yin et al.
2007/0075679 A1 4/2007 Ha et al.
2009/0262506 A1 * 10/2009 Shi ...................... H01M 50/209 361/727
2011/0227527 A1 9/2011 Zhu et al.
2011/0228458 A1 * 9/2011 Richardson ............ A45C 11/00 361/679.01
2011/0255218 A1 * 10/2011 Pakula .................. H04M 1/026 361/679.01
2012/0002355 A1 1/2012 Chen
2012/0118773 A1 * 5/2012 Rayner .................. A45C 11/00 206/320
2012/0228181 A1 * 9/2012 Damon ................ A45C 13/002 206/521
2012/0314354 A1 * 12/2012 Rayner ................. G06F 1/1613 361/679.01
2013/0027862 A1 * 1/2013 Rayner ................. G06F 1/1613 361/679.3
2013/0220841 A1 * 8/2013 Yang ....................... B63C 11/02 206/37
2013/0220847 A1 8/2013 Fisher et al.
2013/0292288 A1 * 11/2013 Willes ................... H04M 1/185 206/521
2013/0294020 A1 * 11/2013 Rayner ................. G06F 1/1626 361/679.01
2014/0021909 A1 1/2014 Klawon et al.
2014/0152890 A1 * 6/2014 Rayner .................. H04N 23/51 277/312
2014/0190842 A1 * 7/2014 Rumfola, III ...... A45C 13/1084 206/37
2014/0190843 A1 * 7/2014 Rumfola, III ...... A45C 13/1084 292/157
2014/0332417 A1 * 11/2014 Wicks .................... A45C 11/00 206/37
2015/0062787 A1 * 3/2015 Wilson .................. H04M 1/185 361/679.01
2015/0264822 A1 * 9/2015 Poon ...................... A45C 11/00 224/191
2016/0066460 A1 * 3/2016 Rayner .................. A45C 11/00 224/191
2016/0094263 A1 * 3/2016 Fathollahi ............ B29D 99/006 455/575.8
2016/0254836 A1 * 9/2016 Alsberg ................. A45C 11/00 455/575.8
2017/0135454 A1 * 5/2017 Poon ..................... H04M 1/185
2017/0201285 A1 * 7/2017 Liu ...................... H04B 1/3888
2018/0191392 A1 * 7/2018 Poon ..................... H04M 1/185
2018/0234127 A1 * 8/2018 Lambert ................ A45C 11/00
2020/0319531 A1 * 10/2020 Brisco .................... H04N 23/51
2020/0337172 A1 * 10/2020 Wei .................... G02F 1/133308
2020/0351396 A1 * 11/2020 Poon ....................... H04M 1/04
2022/0200649 A1 6/2022 Carnevali
2022/0232938 A1 * 7/2022 Poon ...................... A45C 11/00
2022/0263532 A1 * 8/2022 Poon ...................... A45C 11/00
2023/0146663 A1 * 5/2023 Zhao ....................... H02J 50/10 320/107
2023/0179691 A1 * 6/2023 Riddiford ............. G06F 1/1624 455/575.4
2024/0055895 A1 * 2/2024 Liao ...................... H02J 50/005
2024/0237793 A1 * 7/2024 Wang ..................... A45C 13/36

OTHER PUBLICATIONS

The Juggernaut. Case, (2013), The Wayback Machine—https://web.archive.org/web/20131229042041/http://www.juggernautcase.com:80/casesmounts.html, (1 Page).

* cited by examiner

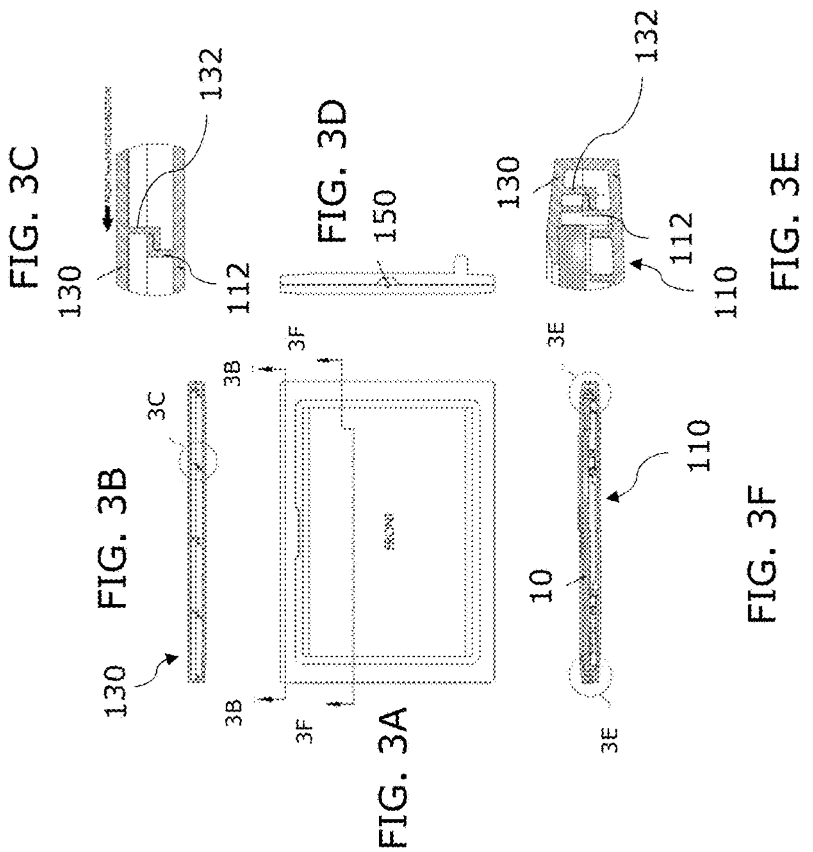
FIG. 3C
130
112
132
FIG. 3D
150
130
132
112
110
FIG. 3E
130
FIG. 3B
3C
3B
3F
3B
3F
FIG. 3A
3E
110
10
FIG. 3F
3E
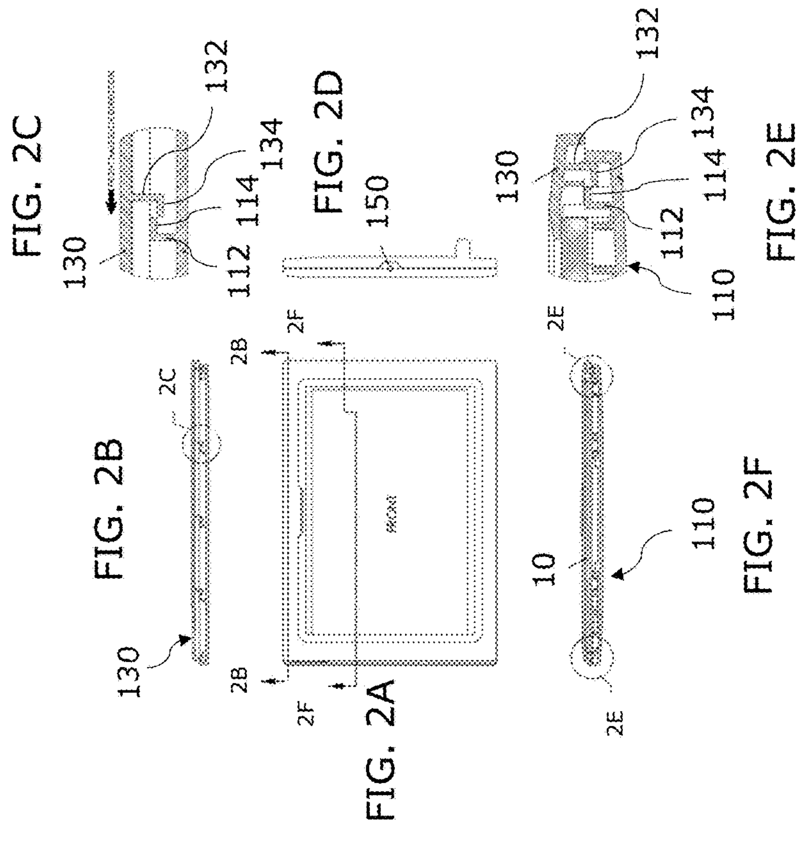
FIG. 2C
130
112
114
134
132
FIG. 2D
150
130
112
114
134
132
110
FIG. 2E
130
FIG. 2B
2C
2B
2F
2B
2F
FIG. 2A
2E
10
110
FIG. 2F
2E

RECONFIGURABLE MOBILE DEVICE CASE

TECHNICAL FIELD

The present invention relates generally to mobile electronic devices, and more particularly, to protective cases and covers for mobile electronic devices.

BACKGROUND

Mobile electronic devices such as phones and tablets are a ubiquitous part of daily life, and an essential tool in many different professions. By their nature, many mobile electronic devices are particularly sensitive to physical damage, which may arise from inadvertent drops, falls, or collisions. As a result, protective cases and covers have been developed for mobile electronic devices that provide a measure physical protection while minimizing disruption to or loss of device functionality.

The usefulness of protective covers may be limited, however, by the physical features of the electronic device for which the cover is designed. For example, the cost or adaptability of protective covers may be adversely impacted by the degree to which those covers must be tailored to a particular mobile electronic device. There remains a need to provide improved protective covers for mobile devices addressing these issues.

SUMMARY

Aspects of the present invention are directed to a mobile device case, mobile device stand, and methods and uses therefor.

One mobile device case includes a rear cover and a front cover. The rear cover is configured to cover at least a portion of a rear surface of the mobile device. The rear cover includes a plurality of first arms. The front cover is configured to cover at least a portion of a front surface of the mobile device. The front cover includes a plurality of second arms configured to engage with the plurality of first arms to attach the front cover to the rear cover. The rear cover and front cover are configured to accommodate the mobile device therebetween and to prevent removal of the mobile device when the plurality of second arms engage with the plurality of first arms. The plurality of second arms engage with the plurality of first arms via a sliding engagement.

One method for accommodating a mobile device within a mobile device case includes positioning the mobile device between a rear cover and a front cover, the rear cover configured to cover at least a portion of a rear surface of the mobile device, the front cover configured cover at least a portion of a front surface of the mobile device; and sliding the front cover relative to the rear cover to engage the front with the rear cover in such a manner that the rear cover and the front cover accommodate the mobile device therebetween and prevent removal of the mobile device.

One mobile device stand includes a base, a pillar, and a mobile device case. The base is configured to be positioned on a surface. The pillar extends upwardly from the base away from the surface. The pillar includes a pillar connector. The mobile device case includes a rear cover and a front cover. The rear cover includes a case connector configured to mate with the pillar connector such that the mobile case is supported by the pillar when the base is positioned on the surface.

BRIEF DESCRIPTION OF THE DRAWINGS

The invention may be best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures:

FIGS. 2A-2F are views of the example mobile device case of FIG. 1A in an unsecured state.

FIGS. 3A-3F are views of the example mobile device case of FIG. 1A in a secured state.

DETAILED DESCRIPTION

The systems and apparatus disclosed herein are usable to provide protection and security to mobile electronic devices. The disclosed examples may be configured for and used with any type of mobile electronic device that would benefit from a protective case, such as mobile phones, tablets, computers, cameras, navigation devices, payment devices, etc. While the disclosed examples are described herein principally with respect to tablet devices, it will be understood that the invention is not so limited.

The disclosed systems and apparatus are particularly suitable and adapted for use with multiple different types, makes, and/or models of electronic devices. To this end, the disclosed examples include components that can be added, removed, reconfigured, repositioned, and/or otherwise changed to adapt to the size, structure, and/or features of different electronic devices. The disclosed examples may thereby enable protection of different types and sizes of electronic devices without the need for multiple different protective cases.

Additionally, the disclosed systems and apparatus may be particularly suitable for enclosing and protecting a mobile electronic device without the need for additional tools or devices. The disclosed examples include a slide-latching system, which may include multiple slide-latching points of engagement placed around the entire perimeter (e.g. all four peripheral sides) of the mobile electronic device case. This slide-latching system may advantageously eliminate the need for screws or other components, thereby simplifying and streamlining assembly. For additional security, a lock or fastener may be provided to prevent the sliding portions of the mobile device case from inadvertently back-sliding or disassembling.

Additional advantages of the disclosed examples will be apparent from the description herein.

With reference to the drawings, FIGS. 1A-1D illustrate an example mobile device case 100. Mobile device case 100 may be reconfigurable to accommodate and protect different types, makes, and/or models of mobile electronic devices, such as mobile electronic device 10. As an example, mobile device case 100 includes a rear cover 110 and a front cover 130. Additional details of this mobile device case 100 are set forth below.

Figure 1A:
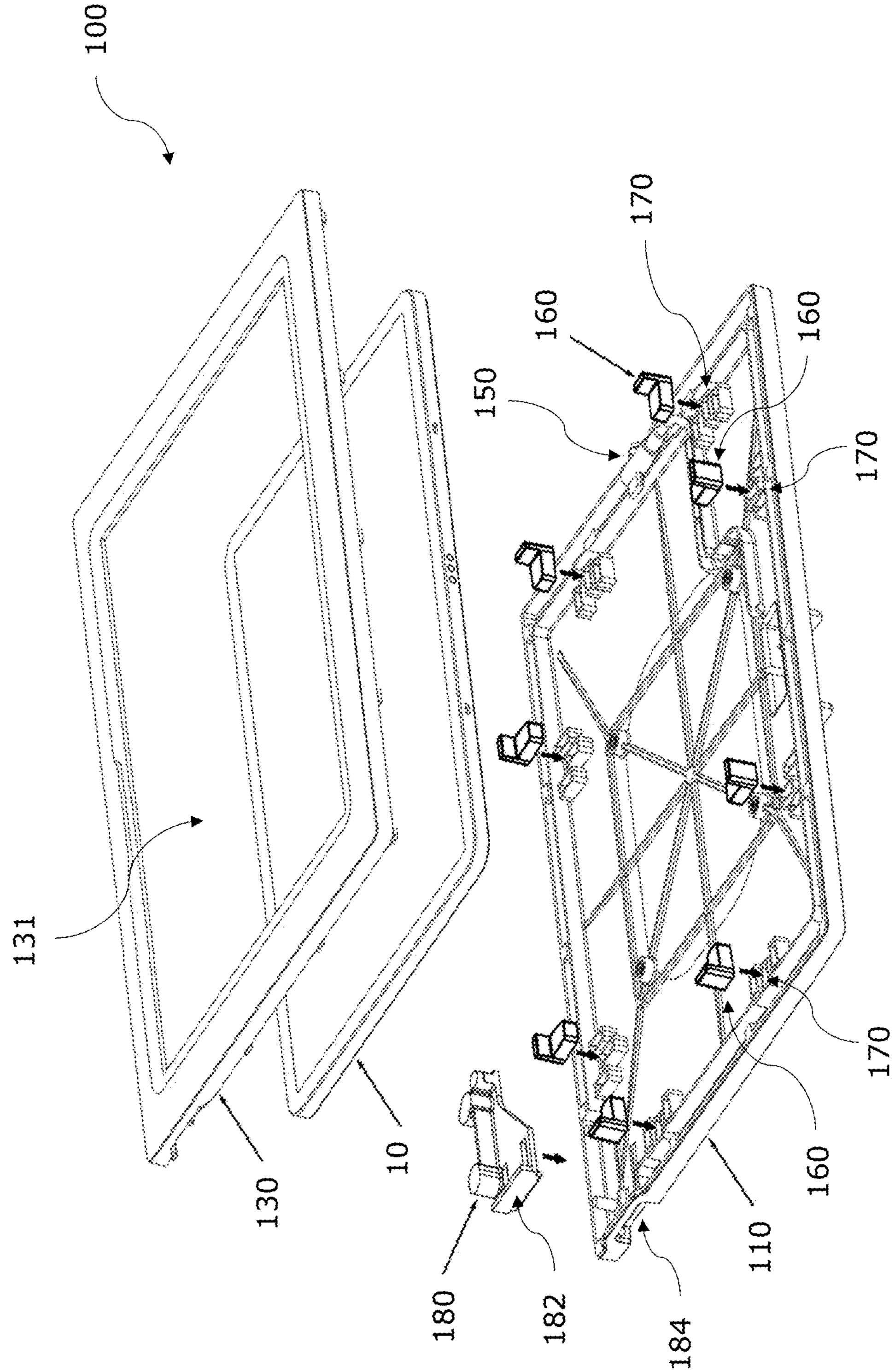
FIG. 1A is an exploded view of an example reconfigurable mobile device case.

Rear cover 110 is configured to cover at least a portion of a rear surface of the mobile electronic device 10. In some examples, rear cover covers only a portion of the rear surface of mobile electronic device 10, e.g. to avoid interfering with the functionality of rear-mounted components such as cameras, scanners, etc. In other examples, rear cover 110 covers the entirety of the rear surface of mobile electronic device 10. As shown in the example of FIG. 1A, rear cover 110 has a rectangular shape with four peripheral edges, corresponding in shape to mobile electronic device 10.

Rear cover 110 may be formed from a material suitable for protecting and/or dissipating force from impacts to mobile device case 100. Suitable materials for rear cover 110 may include rigid polymer and/or elastomeric polymer materials. Other suitable materials will be apparent to those of ordinary skill in the art from the description herein.

Rear cover 110 includes a plurality of arms 112, as shown in FIGS. 2A-2F and 3A-3F. Arms 112 may be positioned along some or all of the peripheral edges of rear cover 110. Arms 112 may be integrally formed with rear cover 110, e.g. from the polymer material of rear cover 110. Alternatively, arms 112 may be separately formed and coupled to rear cover 110. As described in greater detail below, arms 112 are configured to mate with corresponding components on front cover 130. Arms 112 thereby secure rear cover 110 to front cover 130, thereby securing mobile electronic device 10 within mobile device case 100.

Front cover 130 is configured to cover at least a portion of a front surface of the mobile electronic device 10. In some examples, front cover 130 covers portions of the mobile electronic device 10 other than a screen of the device, e.g. portions of the bezel of the mobile electronic device 10. In other examples, front cover 130 covers the entirety of the front surface of mobile electronic device 10. As shown in the example of FIG. 1A, front cover 130 has a rectangular shape with four peripheral edges, corresponding in shape to mobile electronic device 10. Front cover 130 further includes a window 131 to allow access to the screen of mobile electronic device 10. Front cover 130 may be formed from any of the same materials as rear cover 110.

Front cover 130 includes a plurality of arms 132, as shown in FIGS. 2A-2F and 3A-3F. Arms 132 are positioned on front cover 130 in positions corresponding to the positions of arms 112 on rear cover 110. Arms 132 may be integrally formed with front cover 130, or formed separately from front cover 130, as described above with respect to arms 112. Arms 132 are configured to engage with corresponding arms 112 on the rear cover, to attach front cover 130 to rear cover 110.

In an example, arms 112 and 132 include respective ledges 114 and 134, respectively, as shown in FIGS. 2A-2F. Ledges 114 and 134 are configured to engage with one another to attach front cover 130 to rear cover 110 via a sliding engagement, as described below.

As shown in FIGS. 2A-2F, front cover 130 and rear cover 110 may be positioned in contact with each other, offset by a predetermined amount. In this unsecured position, ledges 134 do not contact ledges 114, and arms 132 do not engage with arms 112. Subsequently, front cover 130 can be slid relative to rear cover 110, while the two covers remain in contact. In particular, front cover 130 slides in a direction parallel to the front and rear surfaces of mobile device 10 when mobile device 10 is accommodated within mobile device case 100. As shown in FIGS. 3A-3F, after sliding, ledges 134 on arms 132 engage ledges 114 on arms 112, thereby preventing movement of front cover 130 away from rear cover 110.

When attached, front cover 130 and rear cover 110 are configured to accommodate mobile electronic device 10 therebetween, in a manner that prevents removal of mobile electronic device 10 from mobile device case 100. In some examples, mobile device case 100 may further include a fastener or lock 150 to further prevent removal of mobile electronic device 10. Lock 150 may be coupled to rear cover 110 and/or front cover 130. Lock 150 prevents sliding disengagement of front cover 130 from rear cover 110 after the covers have slid into engagement, as shown in FIGS. 3A-3F. In other words, lock 150 may be actuated after sliding front cover 130 into engagement with rear cover 110, to prevent sliding front cover 130 from being removed or slid into an unsecured state. Lock 150 may be actuated, for example, using a key, tool, or other predetermined movement to ensure that device 10 is secured against removal from mobile device case 100.

Mobile electronic device case 100 is not limited to the above-described components, but may include alternative or additional components, as would be understood by those of ordinary skill in the art. Further examples of components that may be included in mobile device case 100 are described below.

Figure 1B:
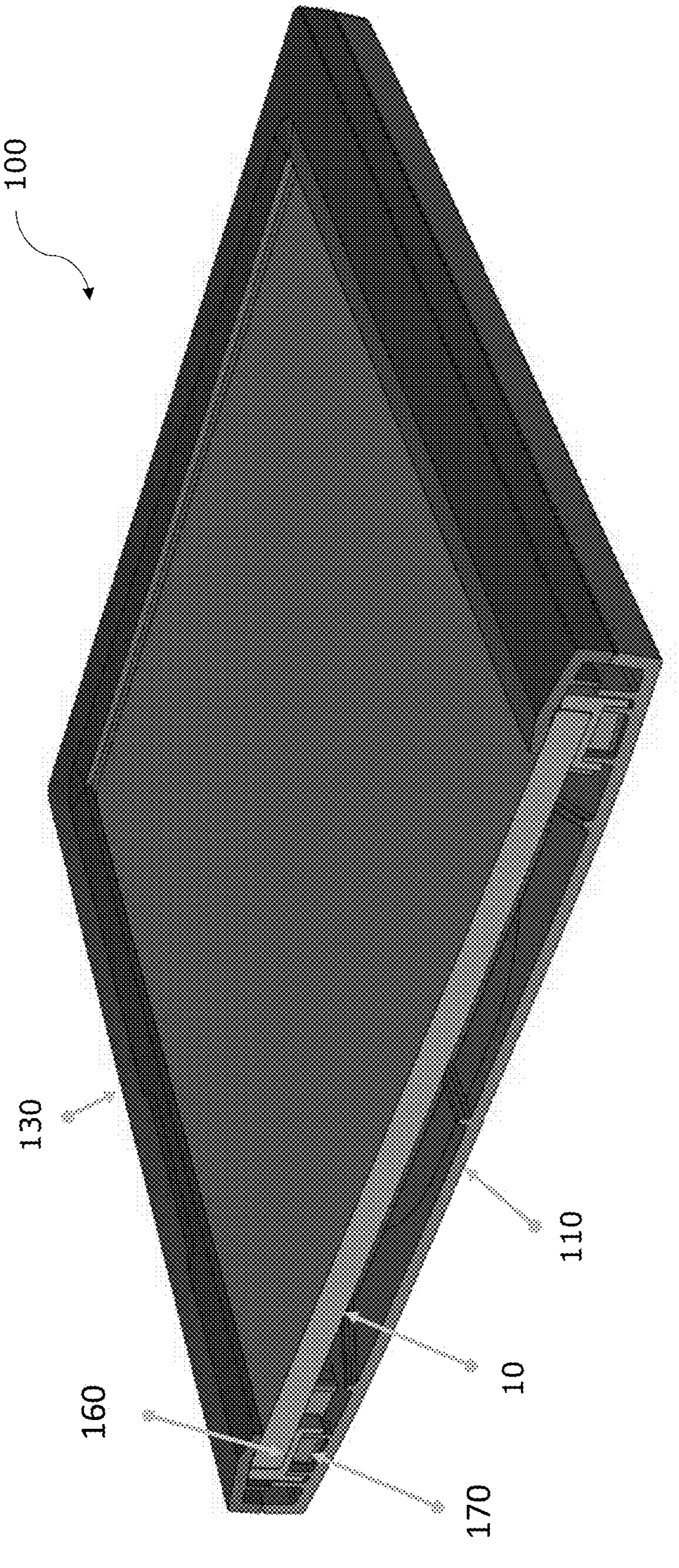
FIGS. 1B-1D are cross-sectional views of the example mobile device case of FIG. 1A.

In some examples, mobile device case 100 may include removable pads 160 and retainers 170. Removable pads 160 are configured to support an edge of mobile electronic device 10 when device 10 is accommodated within mobile device case 100. Removable pads 160 may further be configured to support an edge and a portion of the rear of mobile electronic device 10. In this respect, pads 160 may have an L-shape as shown in FIGS. 1A and 1B. Pads 160 having such a shape can contact the edges and rear of mobile electronic device 10, thereby supporting mobile electronic device in both lateral (e.g. X, Y) directions and in a depth (e.g. Z) direction. Pads 160 may be provided on both the rear cover 110 and front cover 130 to support the mobile electronic device 10 in both upward and downward depth directions, e.g. sandwiching the mobile electronic device. Removable pads 160 may be formed from a material for cushioning and/or firmly holding mobile electronic device 10. Suitable materials for pads 160 may include the same materials as rear cover 110, including rigid polymers such as acetyl, polycarbonate, elastomers such as thermoplastic polyurethane or other thermoplastic elastomers, or combinations thereof.

Retainers 170 are provided on rear cover 110 and/or front cover 130. Each retainer 170 is configured to receive and support one of removable pads 160, such that removable pads 160 can be removably mounted to rear cover 110 and/or front cover 130 at the locations of retainers 170.

Figure 1C:
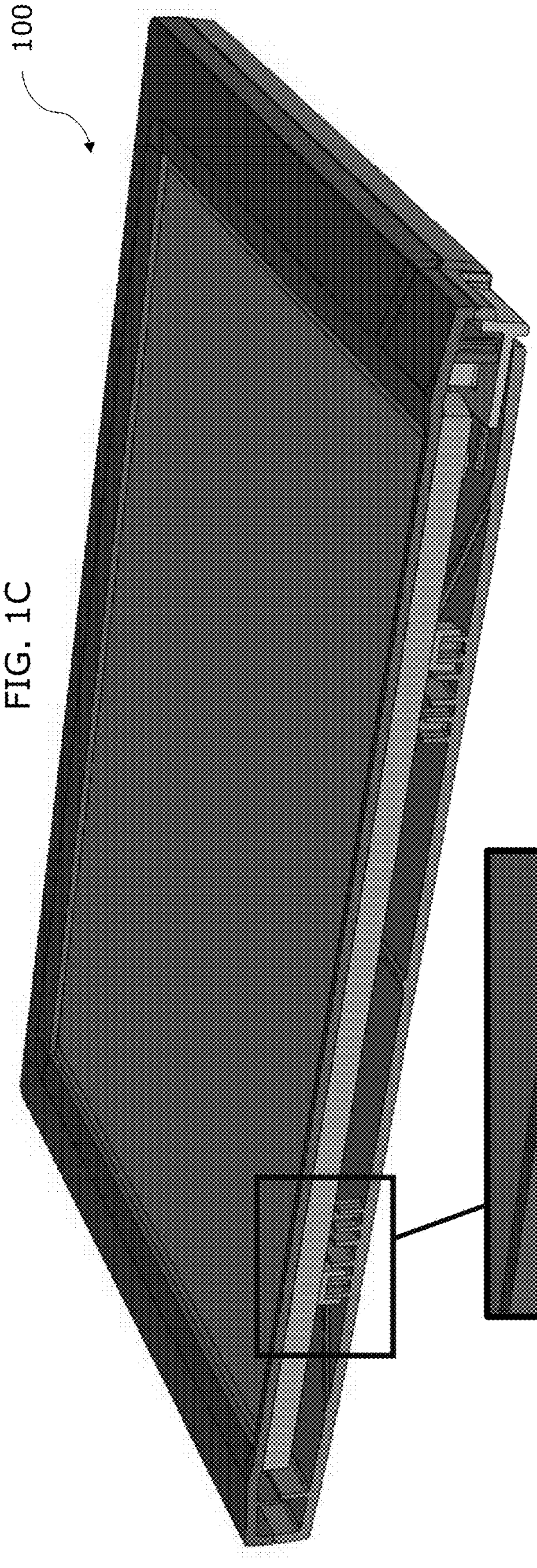
Figure 1D:
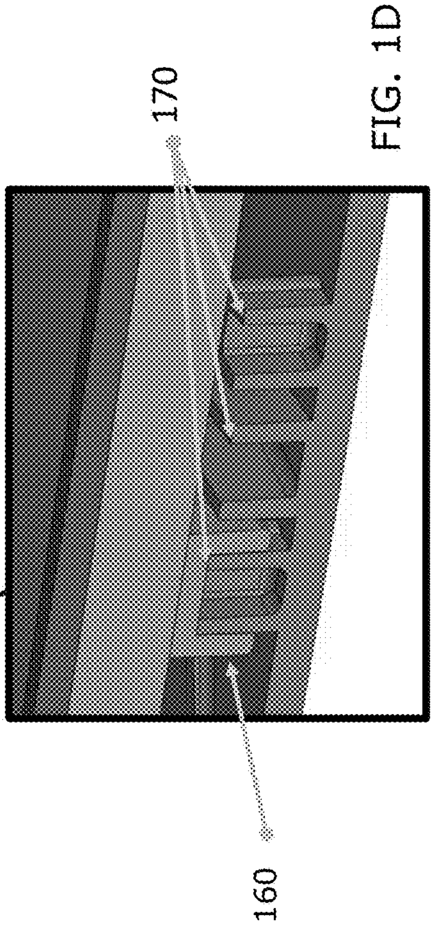

In one example, retainers 170 form holes or slots which are configured to receive corresponding projections or protrusions on pads 160, as shown in FIGS. 1C and 1D. Retainers 170 may also be keyed or dimensioned to ensure that pads 160 are inserted or held in the correct orientation based on the size and shape of the corresponding mobile electronic devices. Retainers 170 may be configured to hold pads 160 e.g. by friction fit, snap fit, or other removable arrangements.

Retainers 170 are positioned based on the size(s) of mobile electronic devices to be accommodated with mobile device case 100. In one example, a first subset of retainers 170 are positioned on rear cover 110 and/or front cover 130 to support peripheral edges of a mobile electronic device having first dimensions (e.g. a first length, width, or thickness). Additionally, a second subset of retainers 170 are positioned on rear cover 110 and/or front cover 130 to support peripheral edges of another mobile electronic device having second, different dimensions (e.g. a second length, width, or thickness). As shown in FIGS. 1C and 1D, retainers 170 of different subsets may be positioned in different lateral positions (e.g. in the X, Y direction) to accommodate devices 10 having different shapes and sizes, and/or may be have different heights (e.g. in the Z direction) to accommodate devices 10 having different thicknesses.

Mobile device case 100 is not limited to two subsets of retainers 170. To the contrary, mobile device case 100 may include any number of retainer groups or subsets, each group or subset positioned to accommodate the dimensions of a particular mobile electronic device to be accommodated. Pads 160 may then be mounted on a corresponding group or subset of retainers 170 to hold the particular mobile electronic device. In this manner, mobile device case 100 can be configured to accommodate, hold, and protect multiple different types, sizes, makes, or models of electronic devices.

Figure 4A:
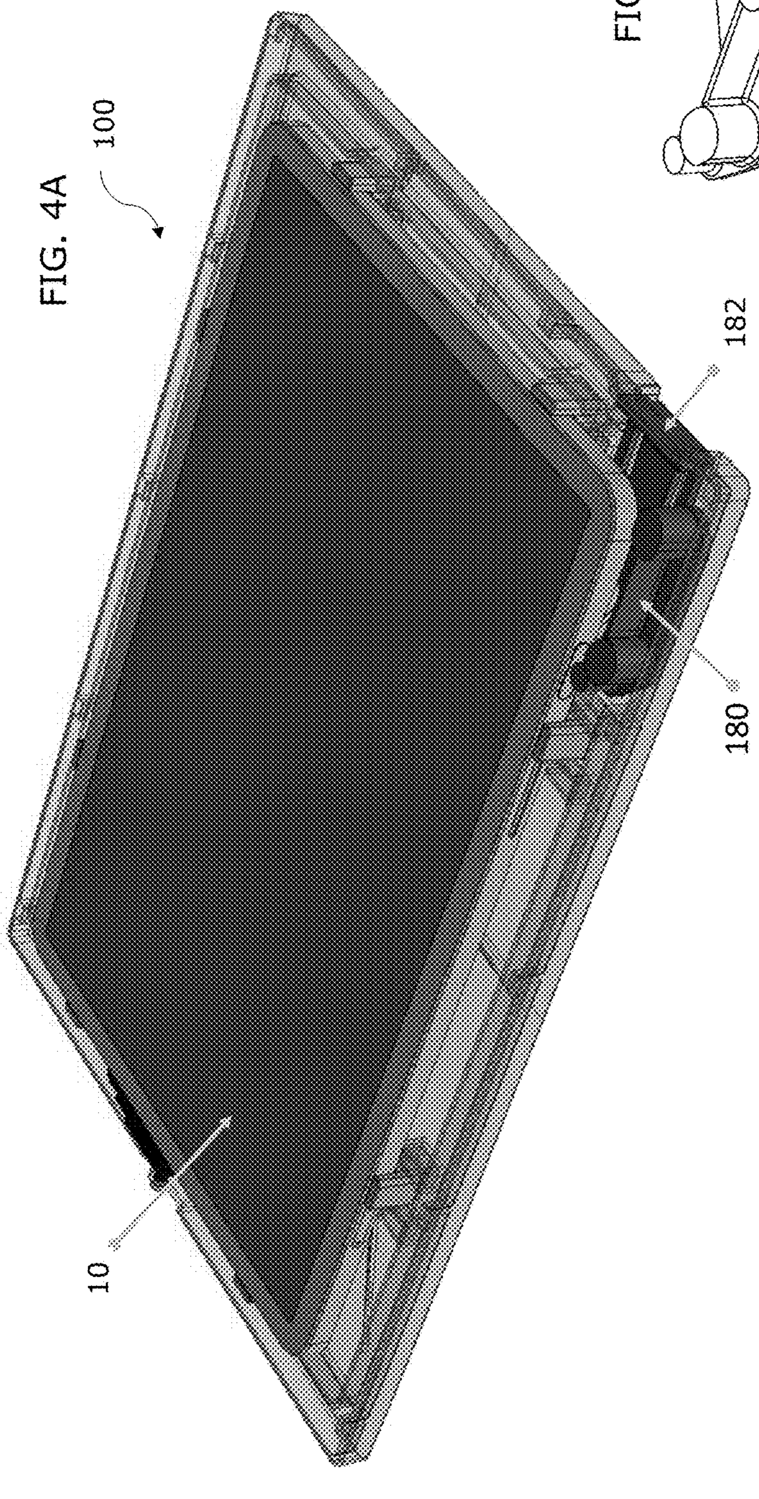
FIGS. 4A-4D are views of the example mobile device case of FIG. 1A including various actuators.

In some examples, mobile device case 100 may include an actuator 180. Actuator 180 is configured to be coupled to at least one of front cover 130 and rear cover 110. As shown in FIG. 4A, actuator 180 is configured to be positioned within mobile device case 100, for example, in a region between front cover 130 and rear cover 110 but outside a peripheral edge of mobile electronic device 10 when mobile electronic device 10 is received therein.

Actuator 180 is movable to actuate a button on mobile electronic device 10. In some examples, actuator 180 may be positioned adjacent a peripheral edge of mobile electronic device 10, so that actuator 180 can be moved to actuate a button on the peripheral edge of mobile electronic device 10. Actuator 180 may be movable to actuate the button by a pivoting movement, sliding movement, or other movements created by manipulation of actuator 180.

Actuator 180 can include an external portion 182 accessible front outside of mobile device case 100. For example, external portion 182 is accessible from outside front cover 130 and rear cover 110, e.g. through opening 184. External portion 182 may be configured to be pressed, pulled, turned, or otherwise manipulated by a user of mobile electronic device 10. In this manner, actuator 180 can enable a user to actuate a button on mobile electronic device 10 that is otherwise inaccessible or concealed by front cover 130 and/or rear cover 110.

Actuator 180 may be configured to be coupled to front cover 130 and/or rear cover 110 in multiple different positions and/or orientations, depending on the size, type, or arrangement of mobile electronic device accommodated by mobile device case 100. For example, actuator 180 can be configured to be coupled to front cover 130 and/or rear cover 110 in a first configuration when the accommodated mobile electronic device has a button in a first position, and can be configured to be coupled to front cover 130 and/or rear cover 110 in a second, different configuration when the accommodated mobile electronic device has a button in a second, different position. In this manner, mobile device case 100 can include a single actuator component that nonetheless is configured to be used with multiple different types, sizes, makes, or models of electronic devices. In a further example, the external portion 182 of actuator 180 may be located in the same location in both the first and second configurations, so that the user familiarity and functionality is not impacted by the different features or configurations of the underlying mobile electronic devices.

Figure 4B:
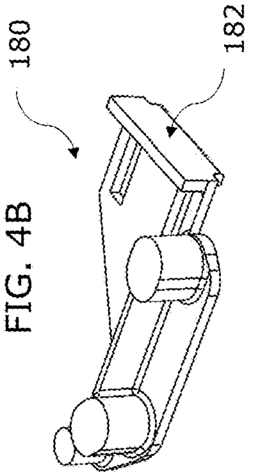
Figure 4C:
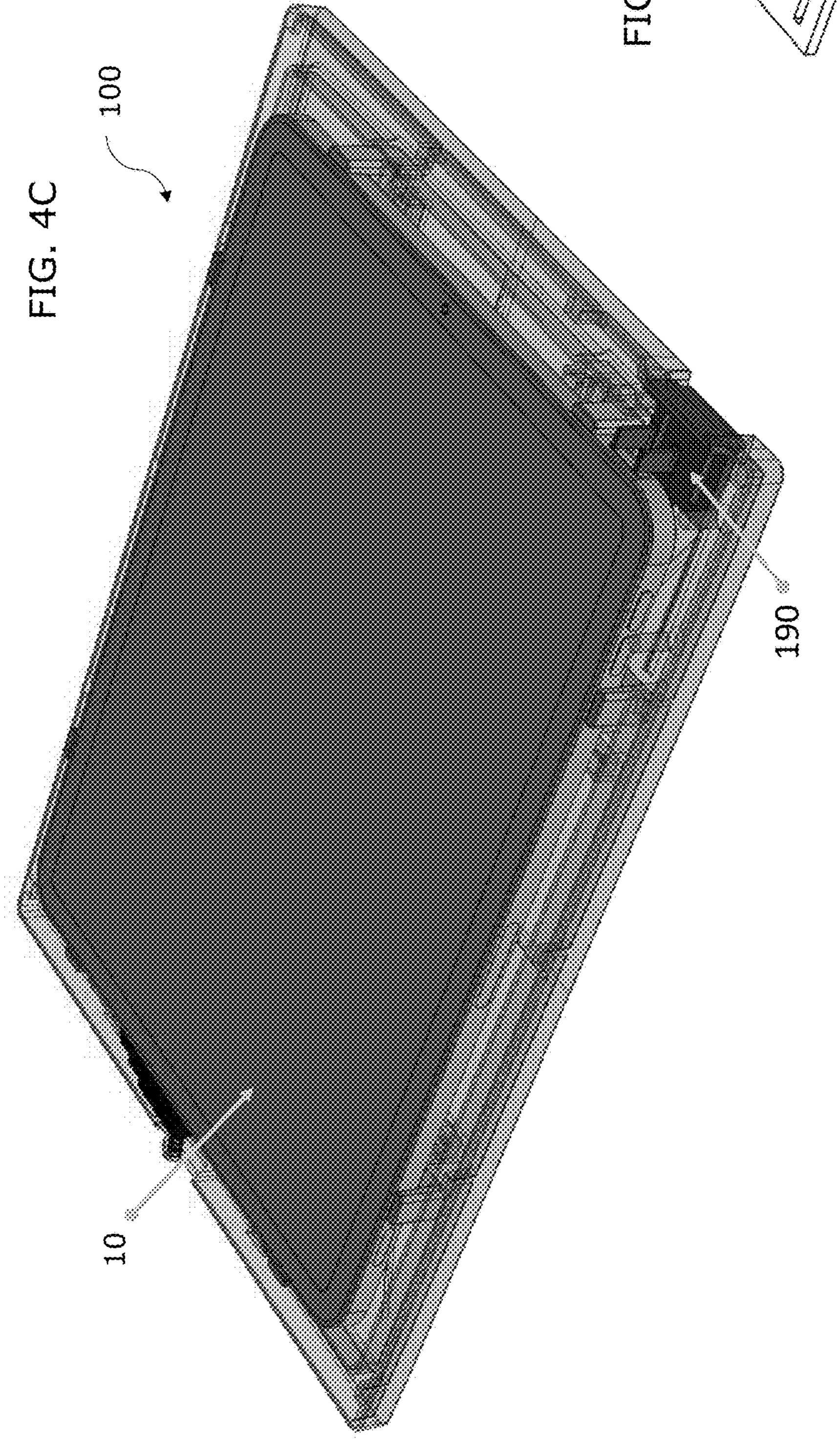
Figure 4D:
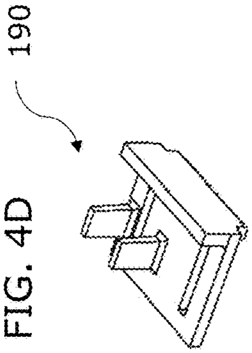

Mobile device case 100 is not limited to a single actuator 180. In one example, mobile device case 100 includes at least one additional actuator 190. The additional actuator may be formed with a different structure or configuration, so that the actuator is movable to actuate an alternative button on mobile electronic device 10. In one example, as shown in FIGS. 4A and 4B, actuator 180 may be configured to actuate a button on a side edge of device 10 by a rocker-type pivoting movement when actuator 180 is pressed by a user. In another example, shown in FIGS. 4C and 4D, actuator 190 may be configured to actuate a button on a top edge of device 10 by a sliding movement when actuator 190 is pressed by a user. Other shapes or configurations of actuators will be known to those of ordinary in the art based on the location or configuration of button(s) on device 10. Likewise, the number of actuators included with mobile device case 100 may be selected based on the number of buttons to be actuated on the various mobile electronic devices to be received within mobile device case 100.

Figure 5:
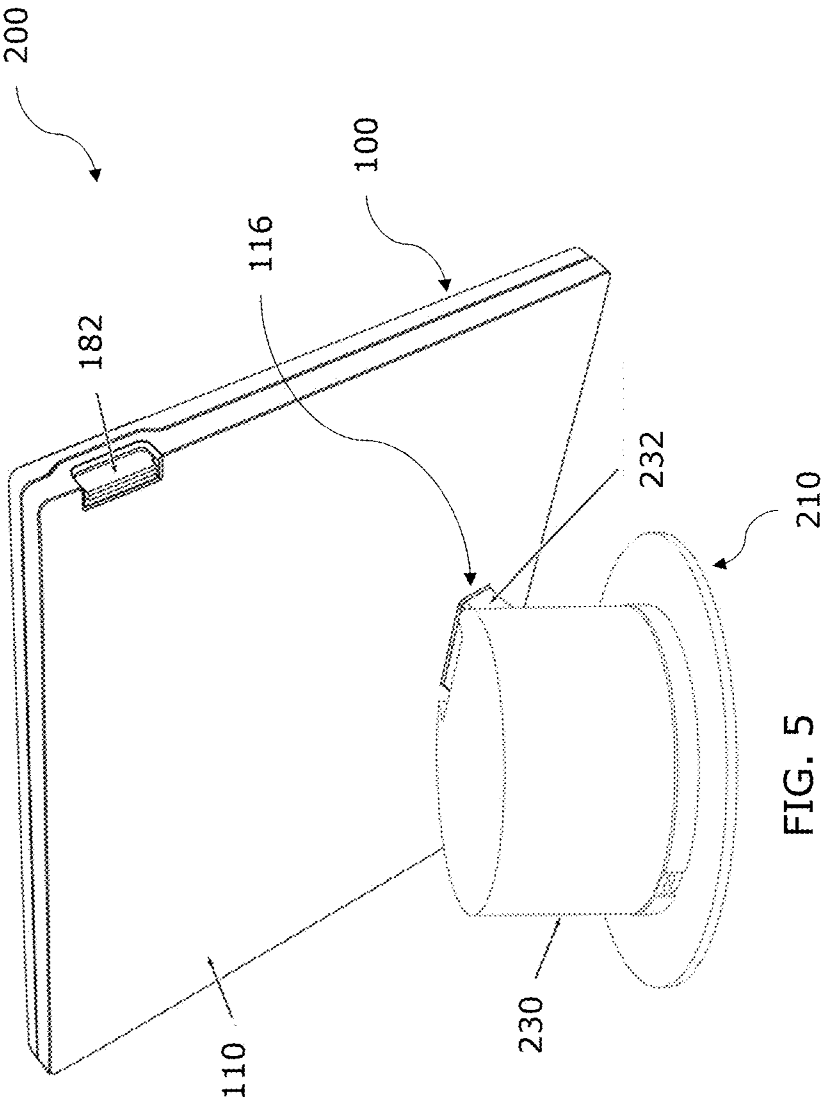
FIG. 5 is a perspective view of an example mobile device stand incorporating the mobile device case of FIG. 1A.

FIG. 5 illustrates an example mobile device stand 200. Mobile device stand 200 can provide for secure mounting, repositioning, and support of different types, makes, and/or models of mobile electronic devices. As an example, mobile device stand 200 includes a mobile device case 100, a base 210, and a pillar 230. Additional details of this example mobile device stand 200 are set forth below.

Base 210 is configured to be positioned on a surface. In an example, base 210 may be placed on or secured to a flat surface, such as a table or countertop. Base 210 preferably provides a broad supporting surface through a range of rotation and repositioning of the mobile electronic device.

Pillar 230 extends upwardly from base 210, e.g. away from the underlying surface. Pillar 230 may be formed integrally with base 210, or may be separately formed and coupled to base 210. In one example, pillar 230 is rotatably mounted on base 210, to enable rotation of pillar 230 (e.g. through 180° or) 360° relative to base 210.

Pillar 230 includes a pillar connector 232, which is configured to mechanically and/or electrically connect with a corresponding connector on mobile device case 100. Through this connector, pillar connector 232 may physically support or hold mobile device case 100. Alternatively or additionally, pillar connector 232 may establish an electrical connection to mobile device case 100 to communicate power and/or data between mobile device stand and a mobile electronic device.

In an example, rear cover 110 of mobile device case 100 includes a case connector 116 on a outward, rear-facing surface thereof. Case connector 116 is configured to mate with pillar connector 232 to physically and/or electrically couple mobile device case 100 to pillar 230. When connected, mobile device case 100 is supported by pillar 230 when base 210 is positioned on the surface.

Pillar connector 232 may be rotatable relative to pillar 230. In an example, pillar connector 232 can be rotated upward or downward to enable tilting of mobile device case 100 when case connector 116 is connected to pillar connector 232. Rotation of pillar connector 232 may desirably enable adjustment of a viewing angle of a mobile electronic device 10 accommodated within mobile device case 100.

Mobile device stand 200 may further include electrical wiring in communication with pillar connector 232 and/or case connector 116. In an example, electrical wiring extends at least partially within mobile device case 100. The electrical wiring may include an electrical connector configured to mate with a corresponding electrical contact on mobile electronic device 10. The electrical wiring may then extend from the electrical connector through mobile device case 100, case connector 116, pillar connector 232, and into pillar 230. In this example, pillar connector 232 and case connector 116 need not include any electrical components. Instead, the connectors may include one or more conduits to facilitate passage of electrical wiring from mobile device case 100 into pillar 230. Electrical wiring may further extend through pillar 230 and out of base 210 to electrically connect with a further electronic device and/or power source. In other examples, pillar connector 232 and case connector 116 may include electrical contacts, connectors, plugs, and/or receptacles to establish such electrical communication between the mobile electronic device 10 and mobile device stand 200.

Figure 6:
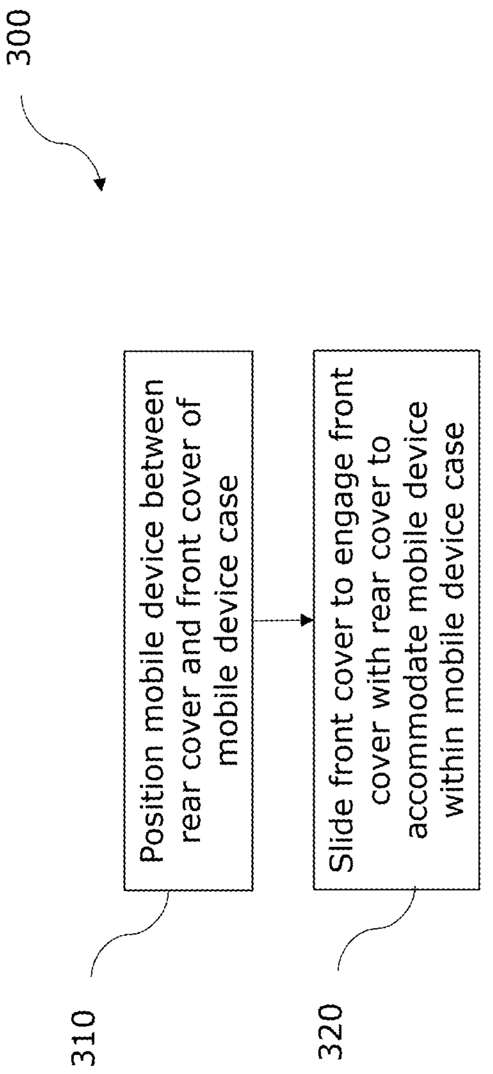
FIG. 6 is a block diagram of an example method for accommodating a mobile device within a mobile device case.

With further reference to the drawings, FIG. 6 illustrates an example method 300 for accommodating a mobile electronic device within a mobile device case. Method 300 may be performed using mobile device case 100. As an example, method 300 includes positioning the mobile device, and sliding the front cover to engage with the rear cover. Additional details of this example method 300 are set forth below.

In step 310, a mobile device is positioned between a rear and front cover of a mobile device case. For example, mobile electronic device 10 may be positioned between rear cover 110 and front cover 130. In this position, rear cover 110 is configured to cover at least a portion of, and preferably all of, the rear surface of the mobile electronic device 10. Likewise, front cover 130 is configured to cover at least a portion of the front surface of the mobile electronic device 10, e.g. a portion surrounding a screen of mobile electronic device 10.

In step 320, the front cover is slid to engage with the rear cover of the mobile device case. For example, front cover 130 is slid relative to rear cover 110 to engage ledges 134 of arms 132 with ledges 114 of arms 112. As described above, this step may include sliding front cover in a direction parallel to the front and rear surfaces of mobile electronic device 10.

By this sliding engagement, rear cover 110 and front cover 130 accommodate mobile electronic device 10 therein, and prevent removal of mobile electronic device 10. Where mobile device case 100 includes a lock 150, method 300 may further include locking front cover 130 relative to rear cover 110 to prevent sliding disengagement of front cover 130 from rear cover 110, and thereby prevent removal of mobile electronic device 10.

As noted above, mobile device case 100 may further include pads 160 and retainers 170. In such examples, method 300 may further include placing pads 160 in corresponding retainers 170 on at least one of front cover 130 and rear cover 110, depending on dimensions of the mobile electronic device 10. In particular, pads 160 may be positioned in a first subset of retainers 170 to support peripheral edges of the mobile electronic device when the mobile electronic device has first dimensions, and a second subset of retainers 170 to support the peripheral edges of the mobile electronic device when the mobile electronic device has second dimensions different from the first dimensions.

In one example, the step of placing pads 160 may be performed before step 310. Then, step 310 may be performed such that mobile electronic device 10 is positioned on pads 160, such that the pads 160 support peripheral edges and a portion of the rear surface of mobile electronic device 10.

As noted above, mobile device case 100 may further include actuator 180. In such examples, method 300 may further include coupling actuator to at least one of front cover 130 and rear cover 110 in a region between the covers and outside a peripheral edge of the mobile electronic device 10. In this location, actuator 180 may be configured to be movable to actuate a button on the peripheral edge of the mobile device. As part of step 320, actuator 180 may be coupled in a first configuration when the mobile electronic device has the button in a first position, and actuator 180 may be coupled in a second, different configuration when the mobile device has the button in a second position different from the first position.

Figure 7A:
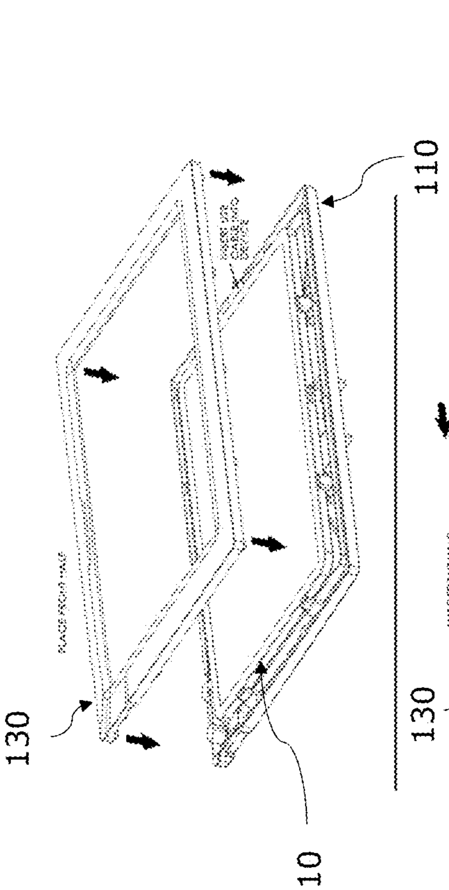
FIGS. 7A-7C are perspective views of the method of FIG. 6.
Figure 7B:
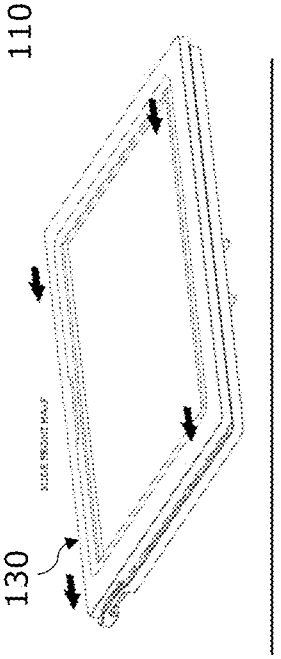
Figure 7C:
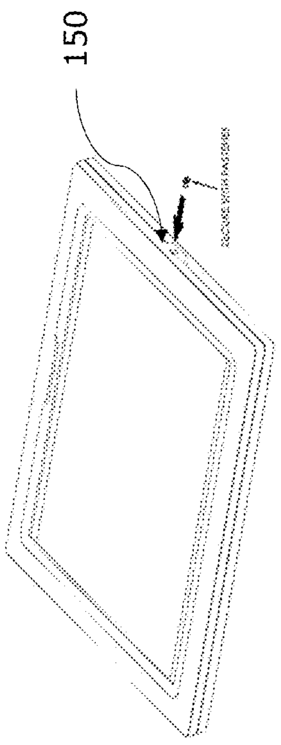

FIGS. 7A-7C illustrate a diagram of the steps of method 300 being performed using mobile device case 100. As shown in FIG. 7A, pads 160 are placed in a subset of retainers 170 on rear cover 110 in positions corresponding to the dimensions of mobile electronic device 10. Subsequently, mobile electronic device 10 is placed on pads 160, and front cover 130 is placed on rear cover 110 overtop mobile electronic device 10.

As shown in FIG. 7B, front cover 130 is slid relative to rear cover 110 to engage ledges 134 of arms 132 with ledges 114 of arms 112. By this sliding engagement, rear cover 110 and front cover 130 for a sealed protective cover accommodating mobile electronic device 10 therein.

As shown in FIG. 7C, where mobile device case 100 includes a lock 150, the lock 150 is fastened to lock front cover 130 relative to rear cover 110 to prevent sliding disengagement of front cover 130 from rear cover 110, and thereby prevent removal of mobile electronic device 10.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A mobile device case comprising:

a rear cover configured to cover at least a portion of a rear surface of the mobile device, the rear cover including a plurality of first arms, the rear cover having a rectangular shape with four peripheral edges, the plurality of first arms being positioned along each of the four peripheral edges;

a front cover configured to cover at least a portion of a front surface of the mobile device, the front cover including a plurality of second arms configured to engage with the plurality of first arms to attach the front cover to the rear cover, wherein the rear cover and front cover are configured to accommodate the mobile device therebetween and to prevent removal of the mobile device when the plurality of second arms engage with the plurality of first arms, and wherein the plurality of second arms engage with the plurality of first arms via a sliding engagement, wherein the sliding engagement includes sliding in a direction parallel to the front and rear surfaces of the mobile device when the mobile device is accommodated between the rear cover and the front cover.

2. The mobile device case of claim 1, wherein the plurality of first arms each include a first ledge that engages with a corresponding second ledge of the plurality of second arms.

3. The mobile device case of claim 1, further comprising a lock coupled to at least one of the rear cover and the front cover, the lock configured to prevent sliding disengagement of the front cover from the rear cover.

4. The mobile device case of claim 1, further comprising:

a plurality of removable pads configured to support an edge of the mobile device; and a plurality of retainers on at least one of the front and rear cover, each of the plurality of retainers configured to receive one of the plurality of pads, wherein the plurality of retainers include a first subset of retainers positioned to support peripheral edges of the mobile device when the mobile device has first dimensions, and a second subset of retainers positioned to support the peripheral edges of the mobile device when the mobile device has second dimensions different from the first dimensions.

5. The mobile device case of claim 4, wherein the plurality of pads are configured to support the edge of and a portion of the rear surface of the mobile device.

6. The mobile device case of claim 1, further comprising an actuator configured to be coupled to at least one of the front cover and the rear cover in a region between the front cover and the rear cover and outside a peripheral edge of the mobile device when the mobile device is accommodated between the rear cover and the front cover, the actuator movable to actuate a button on the peripheral edge of the mobile device.

7. The mobile device case of claim 6, wherein the actuator includes an external portion accessible from outside of the front cover and/or the rear cover to enable a user to actuate the button by manipulating the external portion.

8. The mobile device case of claim 6, wherein the actuator is configured to be coupled to the at least one of the front cover and the rear cover in a first configuration when the mobile device has the button in a first position, and is configured to be coupled to the at least one of the front cover and the rear cover in a second configuration when the mobile device has the button in a second position different from the first position.

9. The mobile device case of claim 6, further comprising at least one additional actuator, the at least one additional actuator being movable to actuate an alternative button on the peripheral edge of the mobile device.

10. A mobile device stand comprising:

a base configured to be positioned on a surface;

a pillar extending upwardly from the base away from the surface, the pillar comprising a pillar connector; and the mobile device case of claim 1, wherein the rear cover includes a case connector configured to mate with the pillar connector such that the mobile case is supported by the pillar when the base is positioned on the surface.

11. The mobile device stand of claim 10, wherein the pillar connector is rotatable in order to enable tilting of the mobile device case when the mobile device case is supported by the pillar.

12. The mobile device stand of claim 10, further comprising electrical wiring positioned at least partially within the mobile device case, the electrical wiring including a first electrical connector configured to mate with a corresponding electrical contact on the mobile device, the electrical wiring extending from the first electrical connector through the case connector and the pillar connector and into the pillar.

13. A method for accommodating a mobile device within a mobile device case comprising:

positioning the mobile device between a rear cover and a front cover, the rear cover configured to cover at least a portion of a rear surface of the mobile device and having a rectangular shape with four peripheral edges, with a plurality of first arms being positioned along each of the four peripheral edges, the front cover configured cover at least a portion of a front surface of the mobile device and having a plurality of second arms configured to engage with the plurality of first arms; and sliding the front cover relative to the rear cover to engage the plurality of second arms of the front cover with the plurality of first arms of the rear cover in such a manner that the rear cover and the front cover accommodate the mobile device therebetween and prevent removal of the mobile device, wherein the sliding includes sliding the front cover relative to the rear cover in a direction parallel to the front and rear surfaces of the mobile device when the mobile device is accommodated between the rear cover and the front cover.

14. The method of claim 13, further comprising locking the front cover relative to the rear cover to prevent sliding disengagement of the front cover from the rear cover.

15. The method of claim 13, further comprising:

placing a plurality of removable pads in corresponding retainers on at least one of the front and rear cover depending on dimensions of the mobile device, such that the plurality of pads are positioned in a first subset of retainers to support peripheral edges of the mobile device when the mobile device has first dimensions, and a second subset of retainers to support the peripheral edges of the mobile device when the mobile device has second dimensions different from the first dimensions.

16. The method of claim 15, wherein the placing is performed before the positioning, and the positioning includes positioning the mobile device on the plurality of pads such that the plurality of pads support the peripheral edges of and a portion of the rear surface of the mobile device.

17. The method of claim 13, further comprising coupling an actuator to at least one of the front cover and the rear cover in a region between the front cover and the rear cover and outside a peripheral edge of the mobile device, the actuator configured to be movable to actuate a button on the peripheral edge of the mobile device.

* * * * *